United States Patent [19]
Mitsuda et al.

[11] 3,922,363
[45] Nov. 25, 1975

[54] METHOD FOR PACKING FREE-FLOWING MATERIALS

[75] Inventors: Hisateru Mitsuda; Fumio Kawai; Mutsuo Kuga, all of Kyoto; Fumitaka Saito, Tokyo; Aijiro Yamamoto, Kyoto, all of Japan

[73] Assignee: Japan Foods Storage & Packaging Co., Ltd., Kyoto, Japan

[22] Filed: Dec. 9, 1974

[21] Appl. No.: 530,808

Related U.S. Application Data

[63] Continuation-in-part of Ser. No. 234,816, May 15, 1972, abandoned.

[30] Foreign Application Priority Data

Mar. 17, 1971 Japan.............................. 46-14915
Apr. 13, 1971 Japan.............................. 46-23601
July 30, 1971 Japan.............................. 46-57217

[52] U.S. Cl...................... 426/410; 53/22 B; 53/24; 426/414

[51] Int. Cl.²........................................ B65B 31/00
[58] Field of Search........... 426/410, 414, 413, 415, 426/392, 419, 418, 106, 126, 127, 627; 53/22 B, 24

[56] References Cited
UNITED STATES PATENTS

| | | | |
|---|---|---|---|
| 2,838,403 | 6/1958 | Notter............................... | 426/398 |
| 2,952,541 | 9/1960 | Fayhee.............................. | 426/419 |
| 3,214,221 | 10/1965 | Finnegan.......................... | 426/410 |
| 3,393,077 | 7/1968 | Moreau............................. | 426/410 |

*Primary Examiner*—Frank W. Lutter
*Assistant Examiner*—Steven L. Weinstein

[57] ABSTRACT

A method for packing free-flowing materials, comprising placing the materials in a bag, filling gaseous carbon dioxide thereinto, sealing the opening of the bag and then allowing the carbon dioxide gas to be adsorbed by the materials, and the tight-fit packages obtained by said method.

5 Claims, 5 Drawing Figures

Time course of $CO_2$ gas adsorption and desorption by the grains (at 25°C).

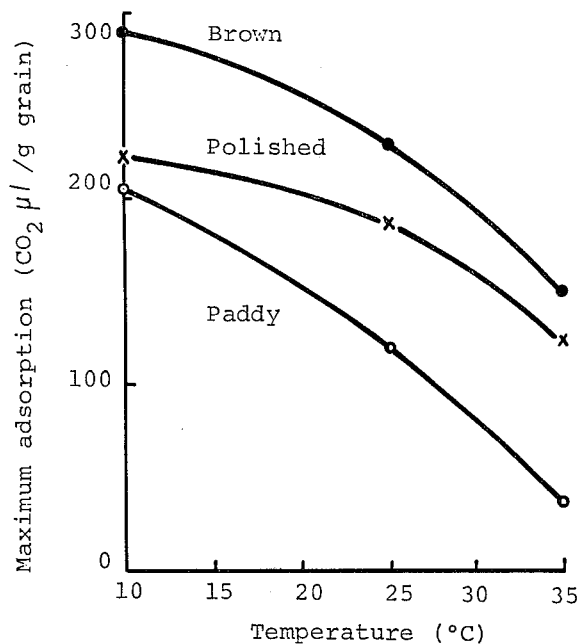
Fig. 1. Temperature dependence of maximum adsorption of $CO_2$ gas by the rice grain.
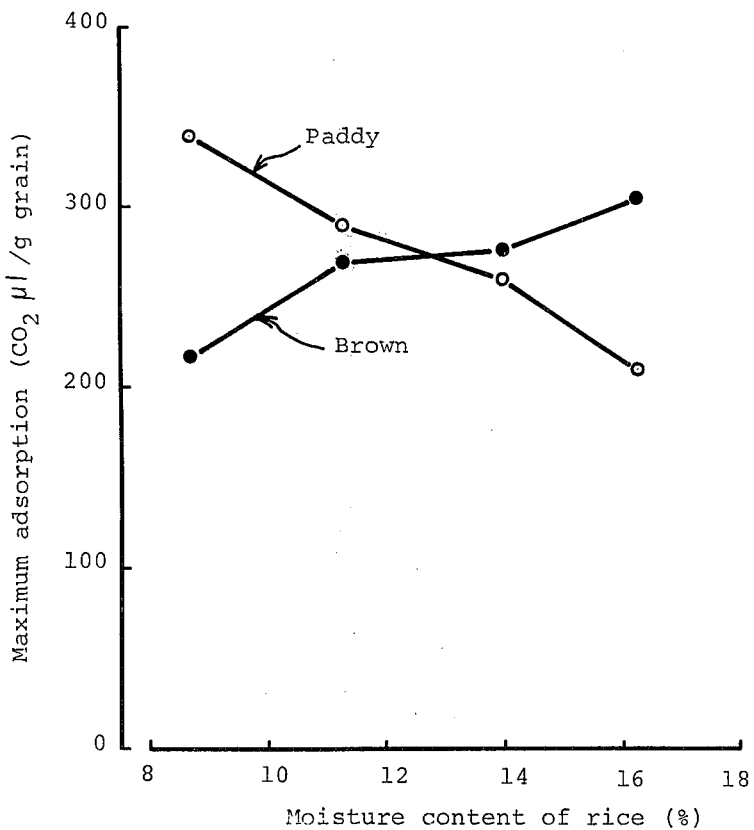
Fig. 3. Moisture content of the grains and the $CO_2$ gas adsorption (at 25°C).

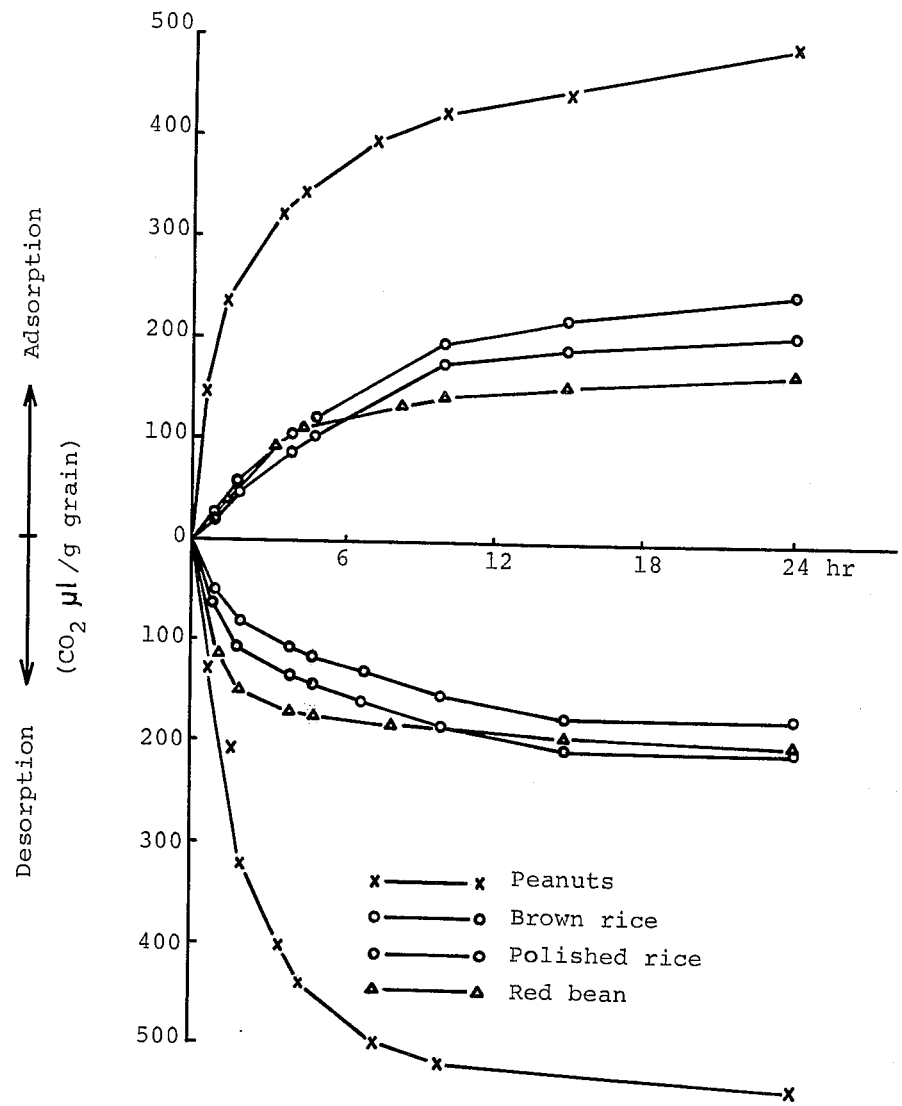
Fig. 2. Time course of $CO_2$ gas adsorption and desorption by the grains (at 25°C).

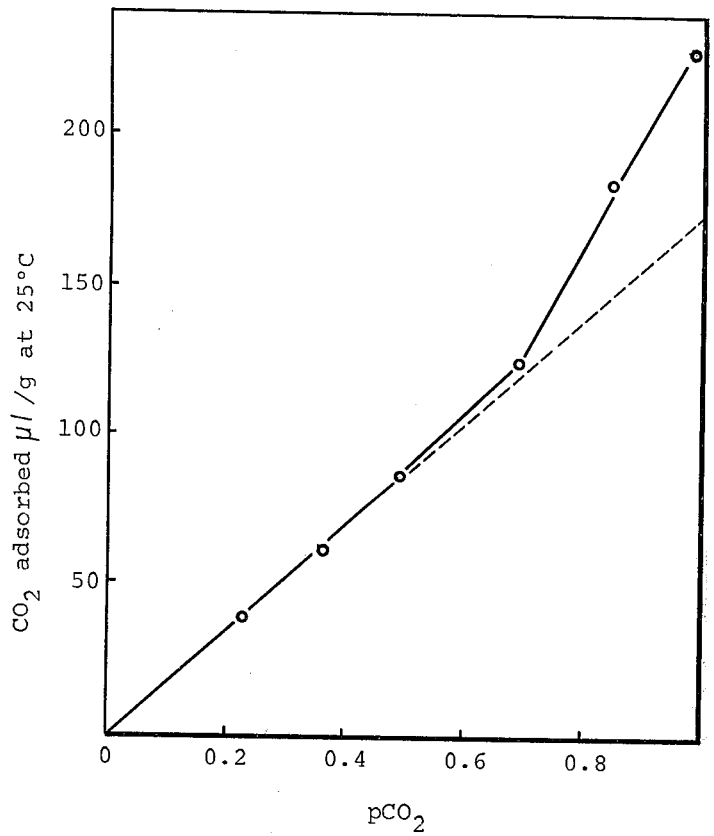
Fig. 4. Carbon Dioxide Adsorption by Brown Rice under the Various Partial Pressure of $CO_2$ ($pCO_2$)
The amount of $CO_2$ gas adsorption was measured by the Warbarg's manometer under the mixed gas phase consits of carbon dioxide and nitrogen.

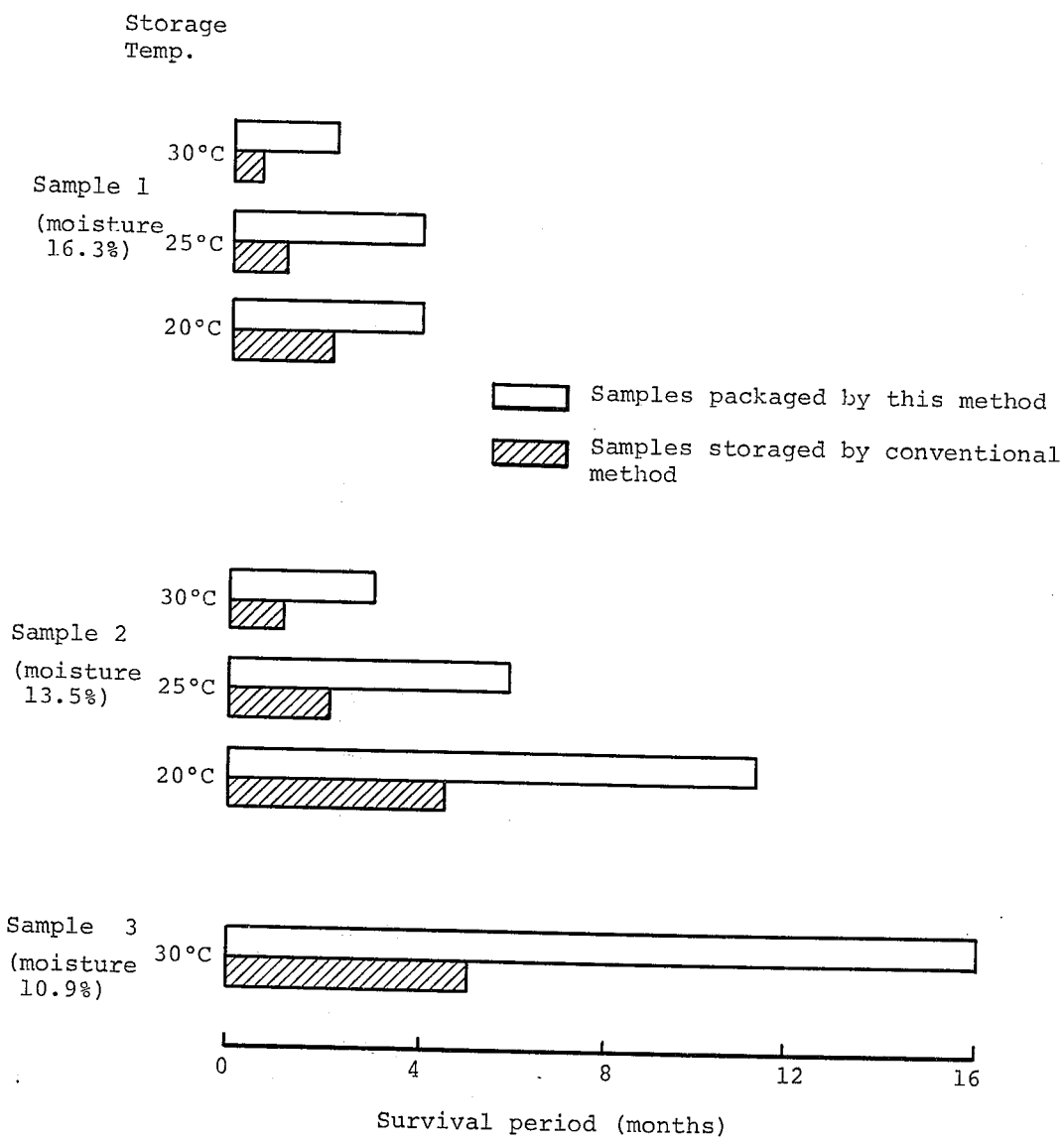
Fig. 5. Survival Time of Paddy Rice
(periods for maintaining the germination coefficient of above 90%)

METHOD FOR PACKING FREE-FLOWING MATERIALS

RELATED APPLICATION

This application is a continuation-in-part of Ser. No. 234,816, filed Mar. 15, 1972, now abandoned.

The present invention relates to a new method for packing free-flowing materials such as grains, beans or the like into a tightly sealed shaped form and the new type of packages resulted therefrom.

Conventionally, grains such as wheat, bean, rice or the like has been tightly packed in a bag made of heat-shrinkable films by heating the bag wherein the content is placed so as to allow the film to shrink. Alternatively, the bag filled with grain or the like has been placed in a vacuum chamber to remove air from the bag and then opening edge of the bag is sealed. These processes, however, have such disadvantages that the former is not suitable for packing those substances which are susceptible to heat damages, and the latter is not efficient because it requires two steps in the process and the step of air-removing requires a long period of time. Particularly, in packing the powdered substances, the powder may be easily blown off so that it makes difficult to seal the bag perfectly or spoils the external appearance of the package.

When the content to be packed is in the forms of granules or powder such as grain, it will be advantageous if the packed goods can be formed in a desirable shape so that appearance, strength and handing thereof will be necessarily improved.

Since the free-flowing property of the content will be lost upon the completion of such tight-packing, it becomes impossible then to re-shape the packed goods into another shape. Accordingly, it becomes necessary to carry out the shaping step first in the over-all packaging process. When it is desired to form the tightly packaged goods into a specific shape in accordance with the above-mentioned conventional methods, there is no opportunity to carry out the shaping of the packaged goods because the free-flowing property of the content will be lost with very short period of time as the bag shrinks and air is removed from the bag.

It has not been known that grains of beans can be packed tightly and stored for a long period of time while maintaining the quality thereof when they are enclosed within a flexible and gas impermeable bag filled with gaseous carbon dioxide.

We have found that the following facts can be seen when grains or beans are sealed in a flexible bag which is substantially impermeable to air and gaseous carbon dioxide and filled with the suitable amount of gaseous carbon dioxide under the selected conditions.

1. Grains or beans such as unhulled rice, unpolished rice, polished rice, soya bean, flour, black tea, wheat and barley or the like absorb the large amount of gaseous carbon dioxide under the selected conditions. Accordingly, when such grain and gaseous carbon dioxide are enclosed in the bag made of plastic film which is impermeable to air and gaseous carbon dioxide, the gaseous carbon dioxide filled in the bag is absorbed by the grain to reduce the space volume in the bag finally causing the bag to adhere to the goods contained in the bag.

2. After the bag is opened, the goods contained in the bag may release substantially all of the absorbed gaseous carbon dioxide so as to realize preservation of the materials without degeneration thereof.

3. In the above case the tight-fit packing can be obtained by reducing the space volume within the bag, and there exists a period wherein the material to be packed holds the capability of being shaped before the completion of the tight-fit packing. When the material to be packed is shaped and left as it is during this period, the space volume in the bag is further reduced causing the bag to adhere to the material contained in the bag to give the package thus shaped into a specific form.

The details of the method according to the present invention are based on the following facts which have been found originally by the present inventors.

a. Usually, grain or powder such as rice, wheat, soya bean, black tea, coffee or the like possesses the great capability of adsorption of said carbon dioxide. The following Table 1 shows the test result of the adsorption of carbon dioxide by each of these substances:

Table 1

| Kind of Grain | Adsorption Amount At 20°C For 3hrs/Kg |
|---|---|
| unhulled rice | 86 c.c. |
| unpolished rice | 90 |
| polished rice | 70 |
| soya bean | 440 |
| red bean | 64 |
| wheat | 75 |
| sesame seed | 230 |
| corn | 170 |
| flour | 52 |
| rice flour | 60 |
| peanuts | 560 c.c. |
| soybean flour | 216 |
| black tea | 115 |
| coffee | 123 | b. The adsorption rates of these substances vary depending on temperature as shown in the accompanying FIG. 1. The amount of carbon dioxide adsorbed increases at a low temperature. The velocity of adsorption is affected so much by temperature, and 50 – 70% of the total adsorbing amount are adsorbed within five hours. If the substance to be packed is dried or degasified prior to packing, the adsorption amount will be further increased. These relations will present a problem when the amount of carbon dioxide to be adsorbed is determined so that the optimum condition should be determined taking these points well into consideration.

As seen from the FIG. 1, the practical range of temperature in the method is from 5° to 30°C.

c. FIG. 2 is a graph showing the state of adsorption and desorption of the carbon dioxide gas contained in the unpolished rice and the polished rice at the temperature of 25°C. 1 gram of grain (unpolished rice and polished rice) was put into a vessel of Warburg's manometer and was shaked in the atmosphere of 100% carbon dioxide gas. The adsorption amount of the carbon dioxide gas was measured with the elapse of time and is shown by means of a curved line in the graph. The graph shows that, in either case of unpolished rice or polished rice, the adsorption amount of the carbon dioxide gas reaches maximum after about 24 hours and then does not increase remarkably. It also shows that 80 – 90% out of the maximal adsorption takes place within the first 10 hours. As to the transpiration amount, 1 gram of grain (unpolished rice and polished rice) was placed in the atmosphere of 100% carbon dioxide gas for 48 hours to adsorb the gas until fully saturated, transferred quickly into the vessel of Warburg's manometer, and then shaped in air. The transpiration amount of the carbon dioxide gas was measured with the elapse of time and is shown by means of a curved line in the graph. The graph also shows that the carbon dioxide gas adsorbed by the grain in the gas current of carbon dioxide is quickly and almost completely desorbed when the grain is allowed to stand in air.

d. The amount of carbon dioxide adsorbed by grains or beans does not depend on moisture or fat content thereof as seen from the Table 2, Table 3 and FIG. 3.

Table 2

The Amount of Carbon Dioxide Adsorbed By The Grains And Beans

| Material | Moisture Content % | Fat Content % | Maximum Adsorption Amount (25°C) $\mu$l/g |
| --- | --- | --- | --- |
| Sesame seed | 5.5 | 53.9 | 300 |
| Peanuts | 5.1 | 50.0 | 510 |
| Soybeans | 9.8 | 17.1 | 450 |
| Brown rice Polished | 13.7 | 3.1 | 230 |
| White rice | 14.0 | 0.8 | 190 |
| Red beans | 12.3 | 0.5 | 188 |

Table 3

The Amount of Carbon Dioxide Adsorbed By The Defatted Brown Rice

| Material | Fat Content % | Maximum Adsorption Amount (25°C) $\mu$l/g |
| --- | --- | --- |
| Original | 2.7 | 230 |
| Defatted Sample 1* | 2.1 | 330 |
| Defatted Sample 2* | 1.35 | 1018 |
| Defatted Sample 3* | 0.2 | 3100 |

*The brown rice was treated with alone or the mixture of ethylether, chloroform and methanol.

Further experiments using radioisotope technique have shown that the grains such as brown rice grain have a great many micropores allowing carbon dioxide gas to condensate therein. Accordingly, it can be speculated that the adsorption of carbon dioxide gas by grains or beans is mainly resulted from the capillary condensation of gaseous carbon dioxide in the micropores of grains.

e. FIG. 4 is a graph showing the relation between the quantity of gaseous carbon dioxide adsorbed be grains and the partial pressure of gaseous carbon dioxide ($pCO_2$).

From FIG. 4, it can be seen that the range of $pCO_2$ value above 0.7 is greatly effective for the adsorption of gaseous carbon dioxide caused by grains or beans.

The anomalous shift of the adsorption curve, as shown in FIG. 4 may be understood as the result of special mechanism of $CO_2$ adsorption, namely, capillary condensation of gaseous carbon dioxide in the micropores of grains or beans.

f. In order to accomplish the tight-packing of grains or beans according to the present invention, the total volume of the gas in a bag should be less than that of the grains or beans to be packed.

g. The bag to be used in the present invention can be made of plastic films which are substantially impermeable to air and $CO_2$ gas. They may be either single layer or laminated films of plural types of plastics. The type of film to be used can be optionally selected according to the purpose of packing. For example, polyamide (commercially known as nylon) or polyester is used as a reinforcing material of the bag. Polyethylene can play the role of heat sealing material and polyvinylidene chloride (commercially known as Saran) may be used to give gas-impermeability to the bag. These may be suitably combined together to suit the purpose of packing. Besides, it is possible to combine them in order to make the bag printable, durable to water or cold weather or resistant to pinholes. Further, a film whereon aluminum vapor is deposited, a film whereon aluminum foil is laminated, or a film laminated with fabric or other material may also be used.

The permeability of carbon dioxide gas varies depending on the material of the plastic films as shown in the following Table 4, and it must be noted that the plastic film to be used for the purpose of shaping must at least be that of a flexible one.

When several kinds of plastic films are laminated together, the permeability of the laminated film is generally identical to that of one of its composite material that is mostly impermeable to carbon dioxide gas.

The permeability of aluminum foil may be considered to be 0 when its thickness is more than 20 $\mu$.

Table 4

Carbon Dioxide Gas Permeability of Various Films (Film Thickness 3/100mm)

| Kind of Film | Permeability (g/25$\mu$/m²/atm) |
| --- | --- |
| Polyvinyl alcohol resin (commercially known as vinylon) | 0.02 |
| Polyvinylidene chloride resin | 0.1 |
| Polyamide | 0.1 |
| Polyester | 0.2 |
| Moisture-proof cellophane | 0.1–0.5 | h. When an automatic bag making and filling machine is used in the present invention, gaseous carbon dioxide is supplied continuously during the process of "former" (also called as sailer or folder) wherein the film wraps up the object to be packed, while maintaining the concentration of the gas at a high level (more than 50%). Alternatively, the gas is caused to blow intermittently so that the object can be packed at a high concentration of carbon dioxide. It is also possible to provide an opening in the bag which is sized large enough to insert a nozzle for injecting carbon dioxide gas from a gas source into the bag. Furthermore, carbon dioxide may be filled by placing solid carbon dioxide into the bottom of the bag, pouring the object to be packed allowing the bag to stand until the air in the bag is replaced by carbon dioxide gas, and then sealing the opening edge of the bag.

The object may also be packed in a bag under the gas-blast of carbon dioxide so that the air contained in the bag can be efficiently removed and the bag can be filled up with carbon dioxide gas.

i. When forming the packed body under the shapable condition into a specific shape such as book-type block, sheet like block, etc., various methods such as stretching, compressing, twisting, rolling, balling, molding or the like can be employed. It is naturally impossible to apply the shaping process immediately after carbon dioxide gas is filled in the bag, as the gas is filled among the space formed between the bag and the object to be packed, and the object to be packed is apt to move freely. The object to be packed is brought into shapable condition as the space volume formed between the bag and the object to be packed reduces with the lapse of time due to permeation or adsorption of the gas or both. When the shaping is carried out during this period in accordance with the above-mentioned shaping method, the form thus obtained will be maintained unless external force is added on it. As the time lapses further and said space volume reduces, the packed substance becomes compact as much as the formed shape is held as it is even if external force is added on it, thus the shaping of the tightly packed body is completed.

The process according to the present invention is applicable to such substances that cannot be packed by a heat-shrinkable package material, as heating is not required at all during the packing process. Further, the present process is more efficient when compared with the vacuum packing process. Furthermore, carbon dioxide gas prevents the object to be packed from its deterioration by aging. Besides, there is a great advantage that the substances in the bag become free of the carbon dioxide after being removed from the bag and restore their original state.

The tightly packed packages shown in the embodiments were kept as they were in (1) a refrigerator at the temperature of 0° – 4°C, (2) a room at the temperature of 10° – 20°C, and (3) an oven at the temperature of 40°C for one year and the state of adhesion was checked. No change was recognized. Further, it has been confirmed that the degree of deterioration of the quality of the substances packed according to the process of the present invention is less than that of the substances packed by the vacuum packing process. Furthermore, as free-flowing substances can be formed in a suitable shape, the external appearance, strength and handling of the packed goods are improved, thus the industrial usefulness of the present invention is extremely great.

One of the advantages obtained from the method of the present invention can be seen in the comparative data as shown in FIG. 5, in which it is shown that the survival time of the grain resulted from the present method is surprisingly longer than that of the conventional method.

The following Table 5 shows the changes of gas composition in the bag during the storage of the same samples as shown in FIG. 5.

Table 5

Changes of The Composition of Gas Atmosphere In The Bag During The Storage of Paddy Rice (Stored At 30°C)

| Gas Composition. | Sample 1* | | Sample 2* | | Sample 3* | |
|---|---|---|---|---|---|---|
| | Initial | After 1 year | Initial | After 1 year | Initial | After 1 year |
| % | | | | | | |
| $CO_2$ | 91.8 | 93.2 | 84.5 | 87.3 | 94.5 | 94.8 |
| $O_2$ | 1.5 | 0.1 | 3.0 | 0.2 | 1.0 | 1.1 |
| $N_2$ | 6.0 | 5.9 | 11.7 | 11.6 | 3.9 | 3.8 |

*Samples 1, 2 and 3 correspond to those of Fig. 5. Gas composition was analyzed by gas chromatography.

The following Table 6 provides some of the embodiments according to the present invention.

Table 6

Fittness of Packages And Composition of Gas Phase

| | Sample 1 | Sample 2 |
|---|---|---|
| Bag | Size 16cm × 20cm (laminated film consisting of polyamide and polyethylene) | Size 16 cm × 20cm (laminated film consisting of polyamide and polyethylene) |
| Grain | Brown rice 379g (corresponding to 269 ml) | Polished rice 375g (corresponding to 268 ml) |
| $CO_2$ gas | 281 ml at 25°C | 200 ml at 25°C |
| Gas composition in a bag sealed | $CO_2$ 94.0% <br> $N_2$ 4.8% <br> $O_2$ 1.2% | $CO_2$ 94.8% <br> $N_2$ 4.4% <br> $O_2$ 1.8% |
| Fitness (inner pressure of package after tightly pack) | 0.87 atmospheric pressure (−99mmHg) | 0.91 atmospheric pressure (−69mmHg) |

The Table 6 also shows the tight-fitness of packages according to the embodiments of the present method.

In the above-mentioned embodiments, the book-type block package was obtained by compressing the packed material, which was in the semi-rigid condition, using a piston and weights. Also, the sheet-like block package was completed by compressing and passing, through two fixed-rollers, the packed material which was also in the semi-rigid condition. The obtained block packages were greatly convenient for handing, transporting or storage.

The invention is illustrated but in no way limited by the following Examples.

EXAMPLE 1

Five kg of unpolished rice were charged in a bag (40cm × 34cm) of the laminated film consisting of polyamide of 25 $\mu$ thick and polyethylene of 50 $\mu$ thick. After introducing $CO_2$ gas from a $CO_2$ gas bomb into the bag at 25°C thereby substituting about 2600cc of the $CO_2$ gas for the air therein, the opening edge thereof was sealed, being $pCO_2$ 0.89, which is then left for about 30 minutes to obtain the tightly packed body having an irregular surface, and 0.8 atmospheric pressure therein.

EXAMPLE 2

Five kg of polished rice were charged in a bag (40cm × 34cm) of the laminated film consisting of polyamide of 25 $\mu$ thick, polyvinylidene chloride resin of 3 $\mu$ thick and polyethylene of 50 $\mu$ thick. After substituting about 2600cc of $CO_2$ gas for the air in the bag by the same method as in Example 1, the opening edge thereof was sealed, which is then left for about 2 hours to obtain the tightly packed body having an irregular surface, and 0.86 atmospheric pressure therein.

EXAMPLE 3

Eight hundred g of soya bean were charged in a bag (25cm × 20cm) of the laminated film consisting of polyamide of 25 $\mu$ thick and polyethylene of 70 $\mu$ thick. After substituting about 350cc of $CO_2$ gas for the air in the bag by the same method as in Example 1, the opening edge thereof was sealed, being $pCO_2$ 0.9, which is then left about 10 minutes to obtain the tightly packed body having an irregular surface, and 0.75 atmospheric pressure therein.

EXAMPLE 4

1.8 kg of soya bean were charged in a bag (35cm × 20cm) of the laminated film consisting of polyamide of 15 $\mu$ thick coated aluminum by the vacuum plating and polyethylene of 50 $\mu$ thick. After substituting about 800cc of $CO_2$ for the air in the bag by the same method as in Example 1, the opening edge thereof was sealed being $pCO_2$ 0.95, which is then left for about 40 minutes to make the packed body in a movable state. The packed body is subjected to rolling by the use of a shaping and then left for about 150 minutes to obtain the tightly packed body having the shape of a cylinder of 12cm in diameter and 20cm in length and 0.71 atmospheric pressure therein.

EXAMPLE 5

Two kg of unpolished rice were charged in a bag (35cm × 20cm) of the laminated film consisting of polyamide of 25 $\mu$ thick and polyethylene of 70 $\mu$ thick. After substituting about 800cc of $CO_2$ gas for the air in the bag by the same method as in Example 1, the opening edge thereof was sealed, being $pCO_2$ 0.87, which is then left for about 15 minutes to make the packed body in a movable state. The packed body is subjected to compression from all sides by the use of a shaping and then left for about 50 minutes to obtain the tightly packed body having the shape of a box (22cm × 13cm × 7cm), and 0.69 atmospheric pressure therein.

EXAMPLE 6

1.8 kg of soya bean were charged in a bag (35cm × 20cm) of the laminated film consisting of polyamide of 15 $\mu$ thick coated alminum by the vacuum plating and polyethylene of 50 $\mu$ thick. After substituting about 800cc of $CO_2$ for the air in the bag by the same method as in Example 1, the opening edge thereof was sealed, which is then left for about 40 minutes to make the packed body in a movable state. The packed body is subjected to rolling by the use of a shaping and then left for about 150 minutes to obtain the tightly packed body having the shape of a cylinder of 12cm in diameter and 20cm in length.

EXAMPLE 7

Three hundred g of soybean flour were charged in a bag (25cm × 16cm) of the laminated film consisting of polyamide of 25 $\mu$ thick and polyethylene of 70 $\mu$ thick. After substituting about 600cc of $CO_2$ gas for the air in the bag by the same method as in Example 1, the opening edge thereof was sealed, which is then left for about 10 minutes to make the packed body in a movable state. The packed body is subjected to compression from both sides by the use of a shaping and then left for about 30 minutes to obtain the tightly packed body having the shape of a plate (24cm × 15cm × 2cm).

EXAMPLE 8

Two kg of unpolished rice were charged in a bag (35cm × 20cm) of the laminated film consisting of polyamide of 25 $\mu$ thick and polyethylene of 70 $\mu$ thick. After substituting about 800cc of $CO_2$ gas for the air in the bag by the same method as in Example 1, the opening edge thereof was sealed, which is then left for about 15 minutes to make the packed body in a movable state. The packed body is subjected to compression from all sides by the use of a shaping and then left for about 50 minutes to obtain the tightly packed body having the shape of a box (22cm × 13cm × 7cm).

EXAMPLE 9

Five kg of polished rice having moisture content of 15.6% were charged in a bag (40cm × 34cm) of the laminated film consisting of oriented polyamide of 25 $\mu$ thick and polyethylene of 50 $\mu$ thick. After introducing $CO_2$ gas having moisture content of less than 0.03% from a $CO_2$ bomb into the bag thereby substituting sufficiently the $CO_2$ gas for the air therein, which leaving about 2500cc of the $CO_2$ gas was sealed, while the bulk density of the packed body was 0.82. The moisture content of the polished rice and that of the $CO_2$ gas were attained equilibrium in a short time. The moisture content of the polished rice measured after 3 months was 14.5%.

EXAMPLE 10

Thirty kg of unpolished rice having moisture content of 15.0% were charged in a bag (90cm × 50cm) of the laminated film consisting oriented polyamide of 25 $\mu$ thick coated polyvinylidene chloride resin of 3 $\mu$ thick and polyethylene of 50 $\mu$ thick. After introducing $CO_2$ gas having moisture content of less than 0.03% from a $CO_2$ bomb into the bag thereby substituting sufficiently the $CO_2$ gas for the air therein, which leaving about 15000cc of the $CO_2$ gas was sealed, while the bulk density of the packed body was 0.84. The moisture content of the unpolished rice and that of the $CO_2$ gas were attained equilibrium in a short time. The moisture content of the unpolished rice measured after 7 months and 14 months respectively was 14.2%.

EXAMPLE 11

Eight hundred g of polished rice having moisture content of 15.2% were charged in a bag (24cm × 17cm) of the laminated film consisting oriented polyamide of 25 $\mu$ thick and polyethylene of 70 $\mu$ thick. After introducing $CO_2$ gas having moisture content of less than 0.03% from a $CO_2$ gas bomb into the bag thereby substituting sufficiently the $CO_2$ gas for the air therein, which leaving about 380cc of the $CO_2$ gas was sealed, while the bulk density of the packed body was 0.84. The moisture content of the polished rice and that of the $CO_2$ gas were attained equilibrium in a short time. The moisture content of the polished rice measured after 2 weeks was 13.8%.

As described in the preceding Examples, the tight-fit packages, especially, of small and compact size obtained by the present methods are very suitable for domestic storage thereof and also usable as the packed foods contained in automatic sales-euipments.

The suitable quantity of the packed foods which are convenient for commercial use as mentioned above may be the weights of 1 – 10 kg.

What we claim is:

1. A method for packing free-flowing materials into a tightly sealed and packed form, said materials being grains or beans which are capable of adsorbing gaseous carbon dioxide when exposed to carbon dioxide and of releasing the carbon dioxide when exposed to air, comprising the steps of placing the materials in a flexible bag which is substantially impermeable to air and gaseous carbon dioxide, introducing gaseous carbon dioxide into the bag and thereby displacing air from the bag, sealing the bag, wherein the partial pressure of gaseous carbon dioxide is in the range of 0.7 to 0.95 and the total volume of all gas is less than that of grains or beans contained therein, and maintaining the bag sealed while the gaseous carbon dioxide is adsorbed by the materials so that the space volume between the bag and the materials is reduced and the flexible bag is drawn tightly about the materials to compress the materials into a tightly sealed and packed form, whereby the materials adsorb a relatively large quantity of gaseous carbon dioxide so long as the bag is kept sealed and may release substantially all of the adsorbed gaseous carbon dioxide after the bag is opened so as to realize preservation of the materials without degeneration thereof.

2. The method of claim 1, wherein the sealed bag is maintained at 5° to 30°C until the tightly sealed and packed form is completed.

3. The method of claim 1 wherein said materials are selected from the group consisting of unhulled rice, unpolished rice, polished rice, soya bean, red bean, wheat, barley, sesame seed and corn.

4. A method for packing free-flowing materials into a tightly sealed and packed form having a block shape, said materials being grains or beans which are capable of adsorbing gaseous carbon dioxide when exposed to carbon dioxide and of releasing the carbon dioxide when exposed to air, comprising the steps of placing the materials in a flexible bag which is substantially impermeable to air and gaseous carbon dioxide, introducing gaseous carbon dioxide into the bag and thereby displacing air from the bag, sealing the bag to form a package wherein the partial pressure of gaseous carbon dioxide is in the range of 0.7 to 0.95 and the total volume of all gas is less than that of grains or beans contained therein, and maintaining the bag sealed during the period in which the gaseous carbon dioxide is adsorbed by the materials so that the space volume between the bag and the materials is reduced, shaping the package within said period into a block shape when the package reaches a semi-rigid state by compressing and passing the package through two-rollers, and allowing additional gaseous carbon dioxide to be adsorbed by the materials after shaping and during said period so that the flexible bag is drawn tightly about the materials to compress the materials into a tightly sealed and packed form in the block shape which is convenient for handling, transportation or storage, whereby the materials adsorb a relatively large quantity of gaseous carbon dioxide so long as the bag is kept sealed and may release substantially all of the adsorbed gaseous carbon dioxide after the bag is opened so as to realize preservation of the materials without degeneration thereof.

5. The method of claims 4, wherein the sealed bag is maintained at 5° to 30°C until the tightly sealed and packed form is completed.

* * * * *